Figure 1:
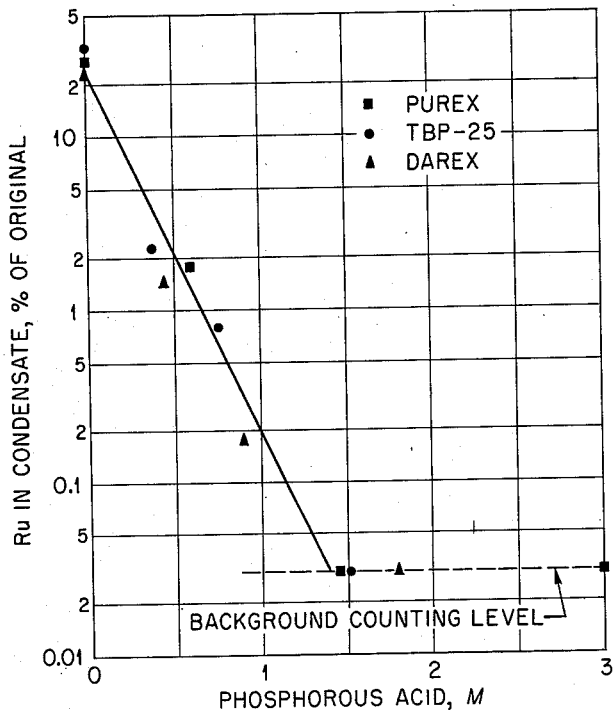

Feb. 4, 1964

W. E. CLARK ETAL 3,120,493

SUPPRESSION OF RUTHENIUM VOLATILIZATION
IN EVAPORATION AND CALCINATION OF
RADIOACTIVE WASTE SOLUTIONS

Filed April 27, 1962

INVENTORS.
Walter E. Clark
Herschel W. Godbee
BY

ATTORNEY.

United States Patent Office 3,120,493
Patented Feb. 4, 1964

3,120,493
SUPPRESSION OF RUTHENIUM VOLATILIZATION IN EVAPORATION AND CALCINATION OF RADIOACTIVE WASTE SOLUTIONS
Walter E. Clark and Herschel W. Godbee, Oak Ridge, Tenn., assignors to the United States of America as represented by the United States Atomic Energy Commission
Filed Apr. 27, 1962, Ser. No. 190,843
6 Claims. (Cl. 252—301.1)

Our invention relates to disposal of radioactive wastes and more particularly to a method of suppressing volatilization of ruthenium in evaporation and calcination of radioactive fission-product solutions.

One of the problems encountered in the development of a nuclear energy industry is disposal of high-level radioactive waste solutions obtained in the reprocessing of irradiated nuclear reactor fuel. Chemical reprocessing of neutron-irradiated fuel is required in order to separate unburned fuel and valuable transmutation products such as plutonium from fission products and inert components of the fuel. Reprocessing is effected by the following procedure: The fuel is removed from the reactor and is stored for a period of at least about 90 to 120 days to allow short-lived fission-product activity to decay. The fuel is then dissolved in nitric acid, and uranium and plutonium values are selectively extracted from the resulting solution with an organic solvent and recovered in purified form. Over 99.5 percent of the fission products, together with corrosion products, inert components of the fuel and process additives such as salting agents, are retained in the aqueous nitric acid solution. Further details of specific embodiments of radiochemical separation processes of this type may be seen by reference to Reactor Handbook, volume 2, pages 107–234, Second Edition (1961). The composition of the resulting fission-product-containing nitric acid solution varies with the composition and irradiation history of the fuel and with the particular process employed. The radiation level of these solutions is high, i.e., up to 5000 curies per gallon, and biologically hazardous isotopes such as strontium 90 are contained therein; accordingly, it has not been possible to release these solutions to any part of man's environment.

Aqueous fission-product solutions produced to date have been been stored in underground steel tanks. While satisfactory as a short-term measure, tank storage presents a disadvantage in that the lifetime of tanks in contact with the corrosive solutions is limited, and eventual failure of tanks and release of radioactivity may be expected. In addition, the cost of tanks and associated equipment such as cooling means is high, and nitric acid in the solutions is lost. Conversion of these solutions to a more stable form such as a non-leachable solid is desired in order to provide an added safety factor, and possibly lower ultimate cost, in permanent storage.

Various methods have been devised for conversion of aqueous fission product solutions to solid form. These methods generally comprise concentration of the solution by evaporation or distillation and calcination of the resulting concentrate to obtain a solid product. Evaporation and calcination have been carried out in fluidized-bed reactors, heated pots, radiant-heated spray columns and rotary kilns. In some cases glass-forming additives such as phosphates or borates and lime or magnesia have been employed to obtain a vitreous, non-leachable product with good mechanical strength and thermal conductivity.

A major difficulty in these solids-forming processes has been the tendency of fission-product ruthenium to volatilize, both during evaporation and calcination. For example, in the absence of control measures, ruthenium is normally volatilized to the extent of 20 to 60 percent in calcining at the elevated temperatures, i.e., above 850° C., required for producing a glassy solid. The volatilized ruthenium, in the form of fission-product isotopes ruthenium 103 and ruthenium 106, represents a substantial portion of the gamma activity of these solutions, and off-gas systems are thus severely contaminated. In some solids-forming processes the volatilized ruthenium has been collected on silica gel or ferric oxide beds and the loaded beds subsequently combined with the calciner product. This procedure, however, is undesirable because of contamination of process equipment and the additional handling of highly radioactive materials required.

Ruthenium volatilization in evaporation and calcination of these solutions has been decreased previously by the use of additives and by control of process conditions. Mild reducing agents such as nitrate ion, nitrogen dioxide and a mixture of tributyl phosphate in a hydrocarbon diluent have been somewhat effective for this purpose. Control of nitric acid concentration, pressure and temperature in evaporation also has been employed to minimize volatilization. These measures, however, have not been fully effective in the preparation of glass-like, non-leachable solids wherein a temperature of at least about 850° C. is required, and ruthenium volatilization to the extent of at least 10 percent has been continually encountered in this type process.

Another problem in evaporation and calcination of aqueous fission-product solutions has been the explosion hazard presented when nitrates are heated in combination with organic matter. Fission-product solutions normally contain large amounts of nitrates and a small amount of residual organic solvents and organic material produced by radiolytic degradation of organic solvents. Removal of the bulk of the nitrate at relatively low temperatures during evaporation would minimize this hazard. In conjunction with nitrate removal, it is further desired to convert the nitrate to a chemical form amenable to recovery as nitric acid.

It is, therefore, an object of our invention to provide a method of suppressing volatilization of ruthenium in evaporation and calcination of aqueous fission-product-containing nitric acid solutions obtained by reprocessing of irradiated nuclear reactor fuel.

Another object is to provide a method of converting aqueous fission-product-containing nitric acid solutions to a stable form.

Another object is to provide a method of converting said solutions to a non-leachable, vitreous solid.

Another object is to provide a method of removing nitrate at a relatively low temperature in evaporation and calcination of said solutions.

Other objects and advantages of our invention will be apparent from the following detailed description and claims appended hereto.

In accordance with our invention, volatilization of ruthenium in evaporation and calcination of an aqueous fission-product-containing nitric acid solution is suppressed by providing phosphite ion or hypophosphite ion in the solution. This additive allows the formation of glass-like solids at elevated temperatures without significant volatilization of ruthenium. As a result, contamination of process equipment is minimized, and simplified off-gas systems may be employed. In addition to suppressing volatilization of ruthenium, the phosphite or hypophosphite reacts with and destroys nitrate at a low temperature. The phosphite or hypophosphite is converted to phosphate in this reaction, and the resulting phosphate enhances the formation of a relatively low-melting vitreous solid with favorable properties for permanent storage.

Our invention is broadly applicable to the evaporation and calcination of aqueous fission-product solutions containing ruthenium. As described above, such solutions are obtained in aqueous reprocessing of neutron-irradiated reactor fuel material, normally uranium-bearing solid fuel elements. Although varying widely in composition with the type and irradiation history of the fuel and the reprocessing method employed, these solutions in general comprise a solution of fission products, corrosion products, inert components of the fuel, and process additives in nitric acid. In addition to nitric acid at a concentration of about 0.5 to 8 M, these solutions contain some, but not necessarily all, of the following constituents: aluminum at a level of 0 to 2.6 M; iron, 0 to 2 M; chromium, 0 to 2 M; nickel, 0 to 3 M; sodium, 0 to 2 M; sulfate, 0 to 2 M; nitrate, 1 to 11 M; and minor proportions of mercury, ammonium and chloride ions. This method is particularly applicable to solutions produced in processes commonly referred to as follows: "Purex" (solvent extraction process for natural uranium fuel elements), "Darex" (dissolution and solvent extraction for stainless-steel-clad fuels), and "TBP-25" (solvent extraction for enriched uranium). The major non-radioactive constituents in typical lots of these solutions are given in the following table.

TABLE I
*Typical Composition of Fission-Product Solutions*

| | Darex | Purex | TBP-25 |
|---|---|---|---|
| Component: | | | |
| $Al^{3+}$ | | 0.1 M | 1.72 M. |
| $Fe^{3+}$ | 1.25 M | 0.5 M | 0.16 mg./ml. |
| $Cr^{3+}$ | 0.38 M | 0.01 M | |
| $Hg^{2+}$ | | | 4.02 mg./ml. |
| $Ni^{2+}$ | 0.18 M | 0.01 M | |
| $Mn^{2+}$ | 0.04 M | | |
| $Na^+$ | | 0.6 M | 2.4 mg./ml. |
| $NH_4^+$ | | | 0.05 M. |
| $H^+$ | 0.75 M | 5.6 M | 1.26 M. |
| $Cl^-$ | 260 p.p.m. | 165 p.p.m. | 160 p.p.m. |
| $NO_3^-$ | 6.0 M | 6.1 M | 6.6 M. |
| $SO_4^{2-}$ | | 1.0 M | |
| Density, g./liter | 1.33 | 1.30 | 1.32. |

The concentration of fission-product ruthenium in these solutions is normally about .002 M to 0.1 M. The principal other fission-product activities are strontium 89, strontium 90, cesium 137, cerium 144, zirconium 95-niobium 95, yttrium 91 and promethium 147. Radioactive transuranium elements may also be present in small amounts. The relative proportions of these isotopes vary with the type of fuel, decay time and irradiation history.

The only currently produced fission product solutions which present difficulty in suppression of ruthenium volatility by the method of our invention are zirconium-bearing solutions obtained in the reprocessing of zirconium-clad fuel material. When present in substantial amounts, e.g., about 0.3 M, zirconium reacts with phosphite or hypophosphite to form a precipitate. Additional amounts of additive and troublesome handling of the precipitate-containing solutions are then required. This effect is not produced by fission-product zirconium alone because of its low concentration in fission-product solutions.

Phosphite or hypophosphite ions may be supplied in the fission-product solution in the form of the corresponding acid, i.e., phosphorous or hypophosphorous acid, as a normal salt such as sodium phosphite or sodium hypophosphite or as an acid salt such as sodium acid phosphite. Sodium hypophosphite is preferred since it is less expensive than other sources of these ions and the sodium contained therein enhances the formation of a glassy solid in calcination.

The concentration of phosphite or hypophosphite required for substantially complete suppression of ruthenium volatilization varies with the particular solution and the evaporation-calcination process employed. Where evaporation and calcination are carried out separately, a concentration of about 0.1 M to 0.4 M may be employed in the initial evaporation step. A concentration of at least 1 molar, and preferably 1.5 M to 2.5 M is employed in the subsequent calcination step. The minimum required concentration increases with increasing amounts of nitrate and increasing amounts of alkali and alkaline earth metals in the solution and decreases with the presence of mercury or palladium (the stable product of ruthenium decay), which catalyze the reaction of nitrate with phosphite or hypophosphite. The required concentration decreases with increasing acidity in the solution.

Although our invention is described primarily with reference to converting the starting solution to a glass-like solid, it is to be understood that the phosphite or hypophosphite additive also may be employed for evaporation without subsequent calcination, e.g., where only a reduction of solution volume is desired. This additive may also be employed where evaporation and calcination are carried out simultaneously such as in a spray calciner or fluidized-bed type process.

In a preferred embodiment, a solution of the type described in Table I, above, is first evaporated in a heated pot until the solution approaches saturation at the boiling point or at a lower temperature suitable for temporary storage of the solution prior to calcination. Supersaturation and formation of a substantial amount of solid material in the solution preferably is avoided since the solution is transferred to another vessel for high-temperature calcination, and the presence of solids results in materials-handling difficulties. Normally these solutions may be evaporated to the extent of a volume reduction factor of about 1.5 to 2 before saturation. Phosphite or hypophosphite ions are provided at a concentration of about 0.1 M to 0.4 M and the solution is heated at the boiling point, i.e., about 108° C. to 135° C. The resulting off-gasses, comprising principally water vapor, nitric acid and oxides of nitrogen, may be treated by conventional techniques to recover nitric acid. Free nitric acid is recovered in a rectifier and the remaining oxides of nitrogen are oxidized to $NO_2$, scrubbed and recovered as nitric acid.

The concentrated solution obtained by evaporation is then transferred to a pot-type calciner and heated to form a solid oxide mixture, which is converted to a glass-like solid by further heating to the melting point and cooling the resulting melt. Phosphite or hypophosphite ions are provided at a concentration of at least 1 molar, and preferably 1.5 to 2.5 molar, together with fluxing agents or glass-forming additives to be described below. The latter materials may alternatively be added after the solution is evaporated to dryness. The temperature required for formation of a glass-like solid varies with the particular solution and additives employed. For the preferred compositions a temperature of about 850° C. to 1050° C. is required to melt the solids mixture.

Off-gases from the calciner may be recovered as nitric acid in the same manner as the evaporator off-gases. The resulting acid, however, may contain a high level of radioactivity owing to entrainment of solid particles in the calciner off-gases. It is accordingly preferred to recycle this acid to the evaporator in order to contain the radioactivity within the system. The acid obtained from evaporator off-gases contains little radioactivity and may be removed and used for such purposes as dissolution of fuel elements.

The composition of the solids mixture in calcination is adjusted to obtain the desired property of forming a glass-like solid at a temperature of about 850° C. to 1050° C. Phosphate, produced by oxidation of phosphite or hypophosphite in the solution, is an excellent glass-forming material. The preferred compositions normally contain about 25 to 50 percent phosphate, reported as $P_2O_5$. Additional phosphate may be added in the event that an insufficient amount is produced by oxidation of phosphite or hypophosphite in the solution. The relative ease of forming a glass-like solid varies with the amount of components in the solution which enhance or inhibit glass formation. Solutions high in sodium or aluminum tend to form a glass readily, while large amounts of sulfate or iron have an adverse effect. Preferred materials for formation of a glass-like solid are sodium oxide, borate, aluminum oxide, magnesium oxide, calcium oxide and lead oxide. If not already present in the solution, these materials are added at proportions suitable for glass formation. The preferred compositions of the more glass-like solids for the three solutions of Table I are given in Table II as follows:

TABLE II

*Composition in Weight Percent of Glasses Incorporating Waste Oxides*

| Glass Constituent | Purex Waste (High Sulfate) | Darex Waste (Stainless-Steel Nitrates-HNO₃) | TBP-25 Waste (Al(NO₃)₃—HNO₃) |
|---|---|---|---|
| $Fe_2O_3$ | 8.6–11.9 | 9.2–20.0 | 0.06–0.09 |
| $Al_2O_3$ | 1.1–1.6 | 0–23.5 | 25.0–33.8 |
| NiO | ~0.2 | 1.2–3.0 | |
| $Cr_2O_3$ | ~0.2 | 2.7–6.4 | |
| $Na_2O$ | 15.5–34.4 | 17.2–21.7 | 18.6–25.5 |
| $P_2O_5$ | 25.9–32.5 | 21.1–45.9 | 38.9–48.1 |
| $SO_3$ | 17.3–23.9 | | |
| PbO | | 0–33.1 | 0–15.9 |
| $MnO_2$ | | 0.3–0.8 | |
| MgO | 0–13.3 | | 0–0.2 |
| $B_2O_3$ | 0–15.6 | 0–20.8 | 0–11.6 |
| $SiO_2$ | | | 0–9.5 |
| CaO | 0–12.0 | | |
| $RuO_2$ | ~0.1 | .003–.01 | ~0.01 |

The relative proportions of the above additives may also be adjusted by previously known techniques to control fission-product cesium volatility and, where appropriate, sulfate volatility. Volatilized sulfate builds up in the nitric acid recovery system and results in a severe corrosion problem. Sulfate volatilization, encountered in the Purex-type waste solutions described above, may be controlled by the addition of chemically equivalent amounts of sodium and calcium and/or magnesium to the extent that the ratio, on a chemical equivalent basis, $(Na+Ca+Mg/SO_4)$ is greater than one. The presence of excess sodium results in volatilization of fission-product cesium 137 activity. Cesium volatility may be suppressed by maintaining the chemical equivalent ratio $(PO_4+SO_4/Na)$ at a value greater than one. For sulfate-containing wastes, calcium or magnesium at an excess of about 10 percent is preferred to avoid these difficulties.

The phosphite or hypophosphite additive may also be employed in combination with previously employed measures for suppression of ruthenium volatilization. For example, volatilization in evaporation may be further decreased by maintaining the nitric acid concentration below about 8 molar.

The glass-like products described above incorporate up to about 35 to 45 weight percent oxides from the starting fission-product solution. This material may be permanently stored in the vessel employed for calcination. The thermal conductivity of the product is sufficiently high to allow adequate dissipation of radioactive heat for volumes of material up to about 8 inches in diameter.

The apparatus employed for the method of our invention is not critical. For most fission-product solutions stainless steel equipment may be employed throughout. High-sulfate solutions or chloride-containing solutions may necessitate the use of material more resistant to corrosion, e.g., titanium, for overhead off-gas equipment.

Our invention is further illustrated by the following specific examples.

EXAMPLE I

A series of distillation experiments was conducted to determine the effect of phosphite on volatilization of ruthenium. Stable ruthenium at a concentration of 0.002 M and radioactive ruthenium 106 at a level of 1 microcurie per milliliter were added to nitric acid solutions having varying nitric acid concentrations and to simulated waste solutions of the compositions given in Table I above. A 130 milliliter sample of each solution was placed in a Gillespie equilibrium still and about 9 milliliters was distilled at a temperature of 108° C. to 119° C. and collected in the condenser. The activity of the condensate was then measured by means of gamma scintillation counting. For each solution a sample without added phosphorous acid and one containing 0.1 molar phosphorous acid were distilled. Further details and the results obtained may be seen by reference to Table III. Under the heading "Reduction Factor" this table lists the factor by which the ruthenium distillation factor is decreased.

TABLE III

*Effect of 0.1 Molar Phosphorous Acid on Ruthenium Volatilization During Distillation*

| Solution | Activity of Ru in Distillate (counts/minute/milliliter) | | Reduction Factor/Ru Distillation Factor [b] |
|---|---|---|---|
| | No $H_3PO_3$ | 0.1 M $H_3PO_3$ | |
| 12 M $HNO_3$ | 2.78×10⁵ | 662 | 447 |
| 6 M $HNO_3$ [a] | 3.76×10⁵ | 145 | 2,920 |
| 1.7 M Al(NO₃)₃—2 M $HNO_3$ | 1.77×10⁴ | 85 | 204 |
| Synthetic Waste Solutions: | | | |
| TBP-25 | 9.08×10³ | 40 | 225 |
| Purex | 3.17×10⁴ | 650 | 50.4 |
| Darex | 9.64×10⁴ | 2.51×10³ | 38.8 |

[a] Ru added as nitrosyl hydroxide. In all other cases Ru was added as the chloride.

[b] Distillation factor = $\frac{C_{Ru} \text{ in distillate}}{C_{Ru} \text{ in solution}}$ It may be seen that the presence of 0.1 M phosphorous acid decreased volatilization of ruthenium by factors of 38 to 2920 in evaporation of these solutions.

EXAMPLE II

The effect of varying concentration of added phosphorous acid on ruthenium volatilization in batch evaporation-calcination to 500° C. was determined in a series of experiments. Stable ruthenium at a concentration of 0.2 milligram per milliliter and ruthenium 106 at a level of 0.1 microcurie per milliliter were added to simulated waste solutions of the compositions listed in Table I above. In each experiment 125 ml. of solution was heated in a 200 ml. Pyrex beaker. The resulting vapor was collected in a condenser and the off-gases were passed through water scrubbers. The condensate was analyzed for ruthenium 106 with a gamma scintillation counter. The solution was heated to dryness, and the resulting solids were heated to 500° C. The results obtained may be seen by reference to FIGURE 1, wherein the volatilized ruthenium in the condensate is plotted against the phosphorous acid concentration. It may be seen that the volatilized ruthenium activity was reduced to background level for each of these solutions by the addition of 1.5 to 2 molar phosphorous acid.

EXAMPLE III

Figure 2:
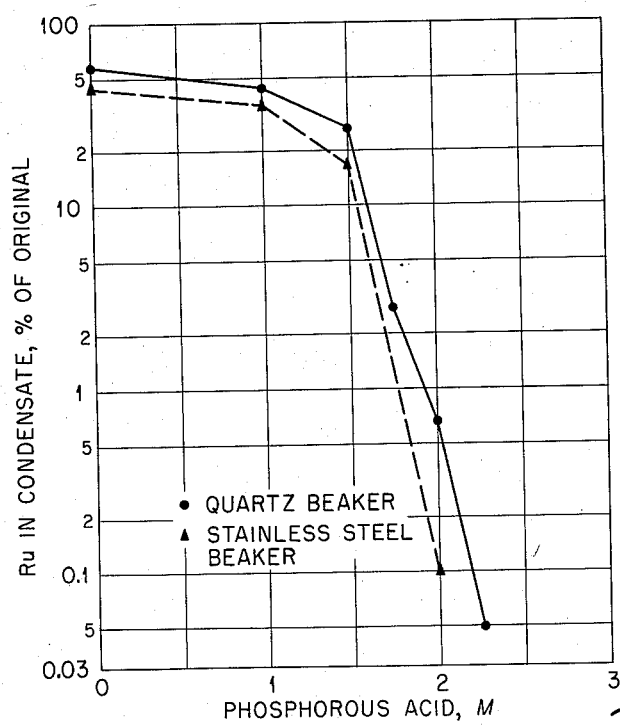

A series of experiments was conducted to determine the effect of varying concentrations of added phosphorous acid on ruthenium volatilization in evaporation and calcination to 1000° C. The solution in each experiment comprised synthetic TBP-25 solution of the composition given in Table I with 0.2 mg./ml. added stable ruthenium and 0.1 μc./ml. ruthenium 106. The solution in each case was evaporated to dryness, and the resulting solids were heated to 1000° C. in a 200 ml. quartz or stainless steel beaker. The condensate was collected and analyzed for Ru 106 activity with a gamma scintillation counter. The results obtained may be seen by reference to FIGURE 2, wherein the ruthenium in the condensate is plotted against phosphorous acid concentration. It may be seen that ruthenium volatilization is decreased to less than 0.1 percent by the presence of 2 molar phosphorous acid. Slightly lower results were obtained for the stainless steel beaker than for quartz. This difference is attributed to the tendency of ruthenium to plate out on metal surfaces.

EXAMPLE IV

Solutions of the composition given in Table I were converted to glasses or glass-like solids in a series of experiments. In each experiment additives were dissolved or, in the case of insoluble materials such as $SiO_2$, slurried in 125 to 500 milliliters of solution. The solution was then evaporated to dryness and the residue was heated in a furnace to a temperature about 50° C. above the softening point. The resulting melt was then allowed to cool and solidify. The compositions of glassy solids obtained in these experiments, together with further details, may be seen by reference to Table IV.

TABLE IV

*Compositions in Weight Percent of the More Glassy Products Obtained on Calcination-Fixation of Various Waste Solutions*

| | Purex | | | Darex | | | TBP-25 | | |
|---|---|---|---|---|---|---|---|---|---|
| | 1 | 2 | 3 | 1 | 2 | 3 | 1 | 2 | 3 |
| Constituent: | | | | | | | | | |
| $Fe_2O_3$ | 11.1 | 10.7 | 11.8 | 22.2 | 9.2 | 10.5 | 0.07 | 0.07 | 0.06 |
| $Al_2O_3$ | 1.4 | 1.4 | 1.5 | none | 23.5 | 22.9 | 26.9 | 28.4 | 25.0 |
| NiO | 0.2 | 0.2 | 0.2 | 3.0 | 1.2 | 1.4 | none | none | none |
| $Cr_2O_3$ | 0.2 | 0.2 | 0.2 | 6.4 | 2.7 | 3.0 | none | none | none |
| $Na_2O$ | 20.9 | 21.8 | 21.1 | 20.7 | 17.2 | 19.7 | 24.0 | 22.7 | 18.6 |
| $P_2O_5$ | 30.0 | 29.0 | 31.9 | 31.5 | 45.9 | 37.3 | 43.5 | 45.9 | 40.5 |
| $SO_3$ | 22.2 | 21.5 | 23.7 | none | none | none | none | none | none |
| PbO | none | none | none | none | none | none | none | none | 15.9 |
| $MnO_2$ | none | none | none | 0.8 | 0.3 | 0.4 | none | none | none |
| MgO | 8.9 | 8.7 | 9.5 | none | none | none | none | none | none |
| $B_2O_3$ | 5.0 | 6.4 | none | 15.5 | none | 4.8 | 5.6 | 2.9 | none |
| $SiO_2$ | none | none | none | none | none | none | none | none | none |
| CaO | none | none | none | none | none | none | none | none | none |
| $RuO_2$ | 0.1 | 0.1 | 0.1 | 0.01 | 0.003 | 0.003 | 0.01 | 0.01 | 0.01 |
| Wt. Percent Waste Oxides | 40.3 | 39.1 | 43.0 | 32.3 | 13.4 | 15.3 | 28.0 | 29.5 | 26.0 |
| Density | 2.70 | 2.74 | 2.70 | 2.97 | 3.17 | 2.61 | 2.47 | 2.36 | 2.84 |
| Volume Reduction | | | | 6.6 | 3.4 | 2.5 | 7.6 | 7.6 | 8.1 |
| ~Softening Point, ° C | 850 | 840 | 850 | 850 | 900 | 800 | 850 | 875 | 900 |

EXAMPLE V

Volatilization of ruthenium was determined in the conversion of Purex and TBP-25 solutions to glassy solids. Calculated amounts of phosphite and other glass-forming additives, together with ruthenium 106 at a level of 0.1 μc./ml., were added to solutions of the composition given in Table I. In each case the solution was allowed to age overnight and was then fed continuously into a closed calcination vessel constructed of stainless steel or quartz and stainless steel in which it was continuously evaporated and calcined. The solution was evaporated to dryness and the residue calcined to form a melt. The melt was allowed to cool and solidify as a glassy solid. The calcination vessel was connected to a condenser and a series of gas scrubbers for the removal of nitric acid, $NO_2$, ruthenium, mercury and other condensibles from the off-gas. Ruthenium 106 activity in the condensate and off-gas was determined by gamma scintillation counting. The composition of the glassy solids, the proportion of ruthenium volatilized and other details are given in Table V, as follows:

TABLE V

*Conversion of Ruthenium-containing Waste Solutions to Glassy Solids*

| | Solid Composition in weight percent | |
|---|---|---|
| | TBP-25 | Purex |
| Constituent: | | |
| $Fe_2O_3$ | 0.06 | 10.2 |
| $Cr_2O_3$ | none | .2 |
| $Al_2O_3$ | 25.0 | 1.3 |
| NiO | none | 0.2 |
| $Na_2O$ | 18.6 | 16.2 |
| CaO | none | 14.3 |
| $P_2O_5$ | 40.5 | 32.5 |
| $SO_3$ | none | 20.4 |
| PbO | 15.9 | none |
| $B_2O_3$ | none | 4.6 |
| $RuO_2$ | 0.01 | 0.1 |
| Percent Waste Oxides | 26.0 | 37.1 |
| Maximum Temperature Reached, ° C | 950 | 910 |
| Ruthenium in Condensate and Off-gas (percent of total in starting solution) | 0.74 | 0.30 |
| Container material | Quartz, Stainless Steel | Stainless Steel |

It may be seen from the above that ruthenium volatilization is controlled to a level of less than one percent by the use of phosphite in the conversion of waste solutions to glassy solids.

EXAMPLE VI

A series of leaching tests was conducted to determine the effectiveness of glass-like solids in retaining fission-product activity. A glassy solid was prepared by the following procedure: To 500 ml. of simulated Purex waste of the composition given in Table I was added 1.52, 0.80, 0.26 and 1.84 moles per liter, respectively, of phosphorous acid, magnesium oxide, borax and sodium hydroxide. The solution was then spiked with mixed fission products. The resulting mixture was heated to a temperature of about 900° C. to form a melt and the melt was cooled to form a glassy solid. The solid was placed in a 500 ml. cell and distilled water was circulated through the cell at a rate of 100 milliliters per minute. The activity in the water was determined daily, and the water was replaced with fresh distilled water once each week. The activity was removed from the solid initially at a rate of $3.2 \times 10^{-2}$ grams per square centimeter per day. At the end of 37 days the rate had decreased to $6.6 \times 10^{-5}$ g./cm.$^2$/day.

These results indicate that only a slight amount of radioactivity would be released if water should come into contact with fission-product-containing solids prepared by the method of our invention.

Our invention is not to be understood as limited by the above examples, but is limited only as indicated by the appended claims. It is also to be understood that variations in apparatus and procedure may be employed by one skilled in the art without departing from the scope of our invention.

Having thus described our invention, we claim:

1. In the process which comprises heating an aqueous ruthenium-containing nitric acid fission-product solution obtained in the reprocessing of neutron-irradiated nuclear reactor fuel, whereby said solution is evaporated, the improvement which comprises providing ions selected from the group of phosphite ions and hypophosphite ions in said solution.

2. The improvement of claim 1 wherein the concentration of said ions is at least about 0.1 M.

3. In the process of converting an aqueous ruthenium-containing nitric acid fission-product solution obtained in the reprocessing of neutron-irradiated nuclear reactor fuel to solid form which comprises evaporating said solution and calcining the resulting solids, the improvement which comprises providing ions selected from the group of phosphite ions and hypophosphite ions in said solution.

4. The improvement of claim 2 wherein the concentration of said ions during calcination is at least about 1 M.

5. The process of converting an aqueous ruthenium-containing nitric acid fission-product solution obtained in the reprocessing of neutron-irradiated nuclear reactor fuel to stable solid form which comprises providing ions selected from the group of phosphite ions and hypophosphite ions in said solution at a concentration of at least about 0.1 M, evaporating the resulting solution until said solution is approximately saturated, providing said ions at a concentration of at least about 1.5 M in the resulting concentrate, heating said concentrate in the presence of glass-forming additives until said concentrate is converted to solids and said solids are melted, cooling the resulting melt and recovering the resulting glass-like solid.

6. The process of claim 5 wherein said solids are heated to a temperature within the range of 800° C. to 1050° C.

References Cited in the file of this patent

AEC Document HW–65806 PTI, Radiant-Heat Spray-Calcination Process for the Solid Fixation of Radioactive Wastes, February 1961, page 24.

Grover et al.: Atom, 56, pages 18, 19, 21, June 1961.